United States Patent

Bianchi

[11] Patent Number: 5,274,353
[45] Date of Patent: Dec. 28, 1993

[54] ANTI-THEFT DEVICE

[75] Inventor: Victor Bianchi, Cannes, France

[73] Assignees: Alain Laumonier; Yves Laumonier; Bruno Laumonier, all of Nesles la Vallee, France

[21] Appl. No.: 768,984

[22] PCT Filed: Apr. 10, 1990

[86] PCT No.: PCT/FR90/00256

§ 371 Date: Oct. 8, 1991

§ 102(e) Date: Oct. 8, 1991

[87] PCT Pub. No.: WO90/12182

PCT Pub. Date: Oct. 18, 1990

[30] Foreign Application Priority Data

Apr. 11, 1989 [FR] France .................. 89 04757

[51] Int. Cl.⁵ .................. B60R 25/10; B62H 5/00
[52] U.S. Cl. .................. 340/427; 340/544; 340/568; 340/571; 340/590; 340/591; 340/592
[58] Field of Search ............ 340/427, 426, 432, 548, 340/544, 564, 571, 572, 568, 590, 591, 592

[56] References Cited

U.S. PATENT DOCUMENTS

| 1,800,943 | 4/1931 | Junkunc . | |
| 3,765,196 | 10/1973 | Balicki | 70/360 |
| 3,866,205 | 2/1975 | Payne et al. . | |
| 4,340,007 | 7/1982 | Hogan | 340/427 |
| 4,698,620 | 10/1987 | Marshall | 340/568 |
| 4,920,334 | 4/1990 | DeVolpi | 340/427 |

FOREIGN PATENT DOCUMENTS 8101261 10/1982 Netherlands .

Primary Examiner—Donnie L. Crosland
Attorney, Agent, or Firm—Young & Thompson

[57] ABSTRACT

Anti-theft device comprising a flexible and deformable elongated assembly (1) which is capable of forming a loop and is provided at one end with a male closure member (2, 64) and at the other end with a female closure member (3, 2) adapted to receive and releasably lock the male closure member (2, 64). One of the closure members (3, 62; 2, 64) is provided with a closure device which can be opened by a key in order to release the other closure member. The elongated assembly (1) is made up of elongated elements (8, 41) undetachably assembled together in interengaged relation in the form of a chain. The elements are swingable with respect to each other so as to form a loop, each elongated element (8, 41) being provided at one end with a female portion (9, 42) and at the opposite end with a male portion (10; 46, 49), the male portion (10; 46, 49) having successively, starting from the opposite end thereof, peripheral retainers (14, 15; 54, 55) undetachably connecting the elongated element (8, 41) to an adjacent elongated element (8, 41), and peripheral grooves (16; 49, 47, 50) separate from the peripheral retainers (14, 15; 54, 55) and limited on the side opposite the peripheral retainers by a shoulder (20, 50).

13 Claims, 4 Drawing Sheets

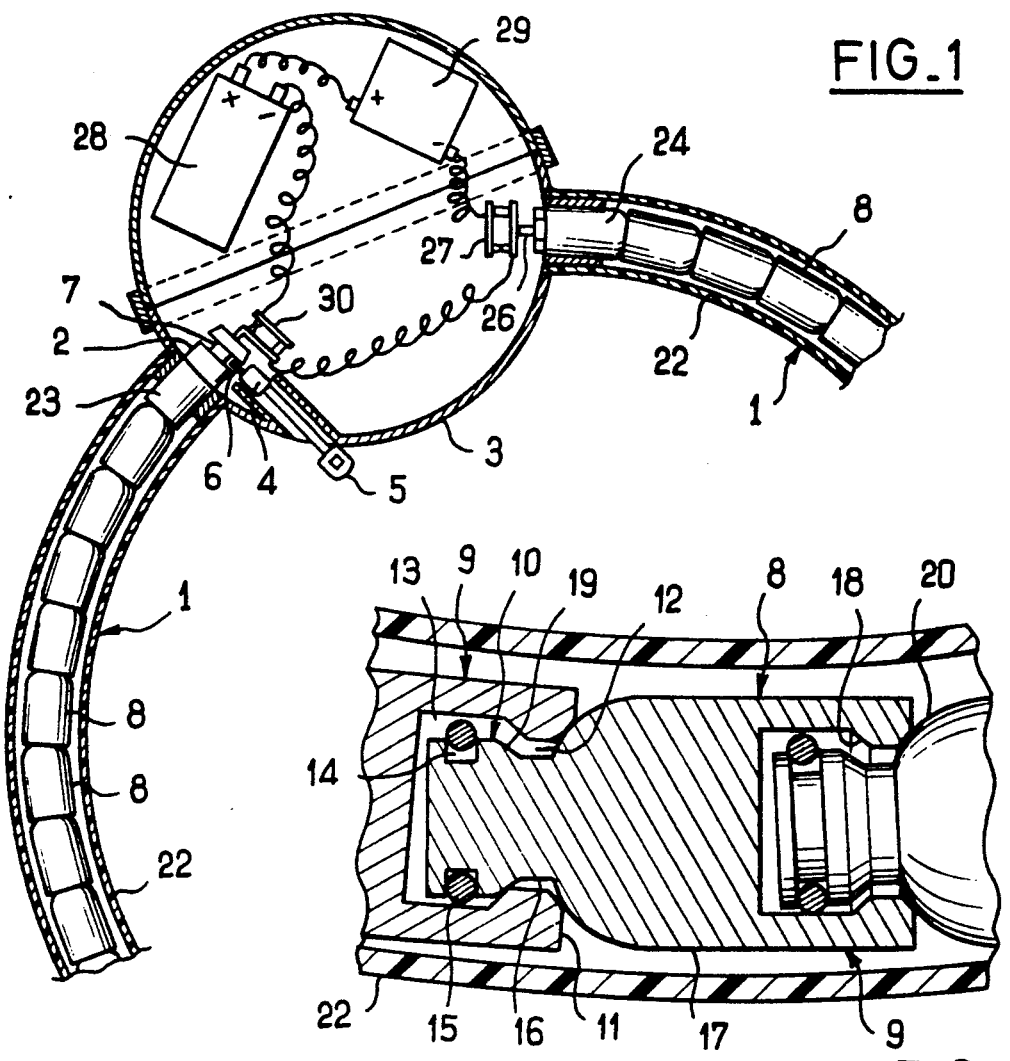
FIG_1
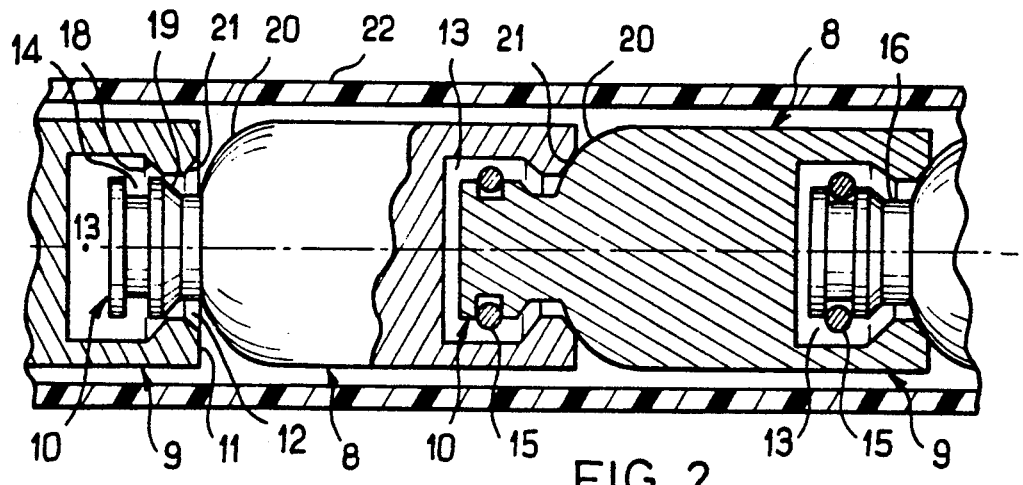
FIG_3
FIG_2

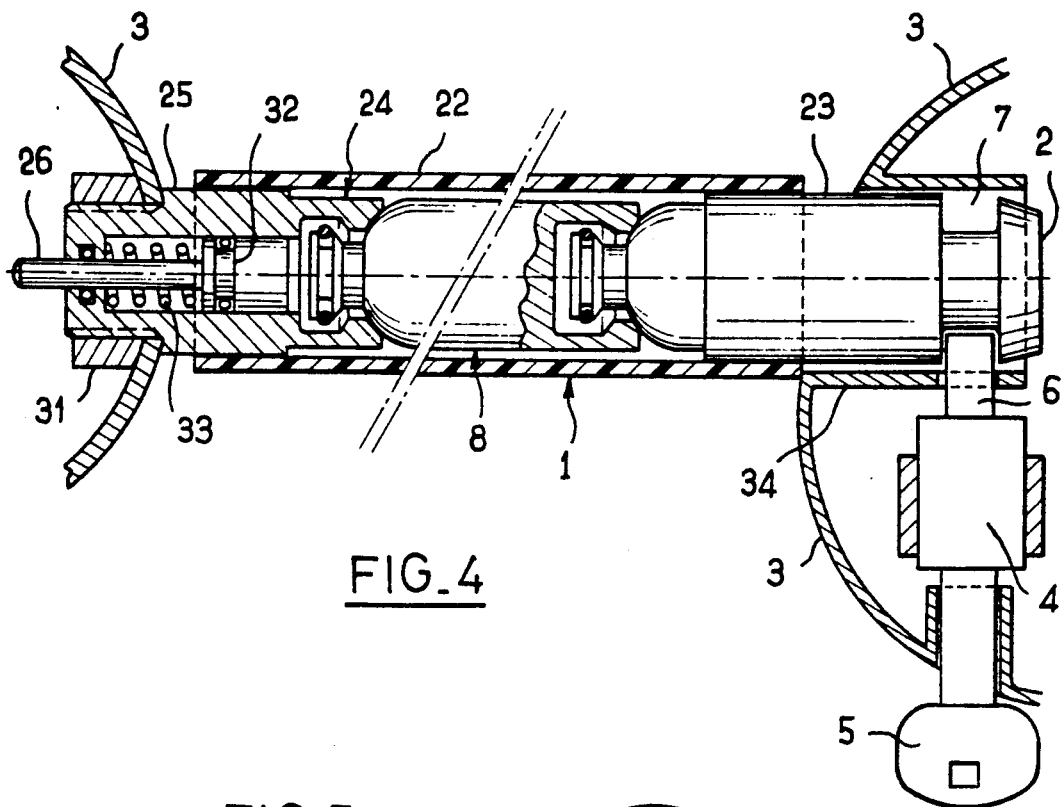
FIG_4
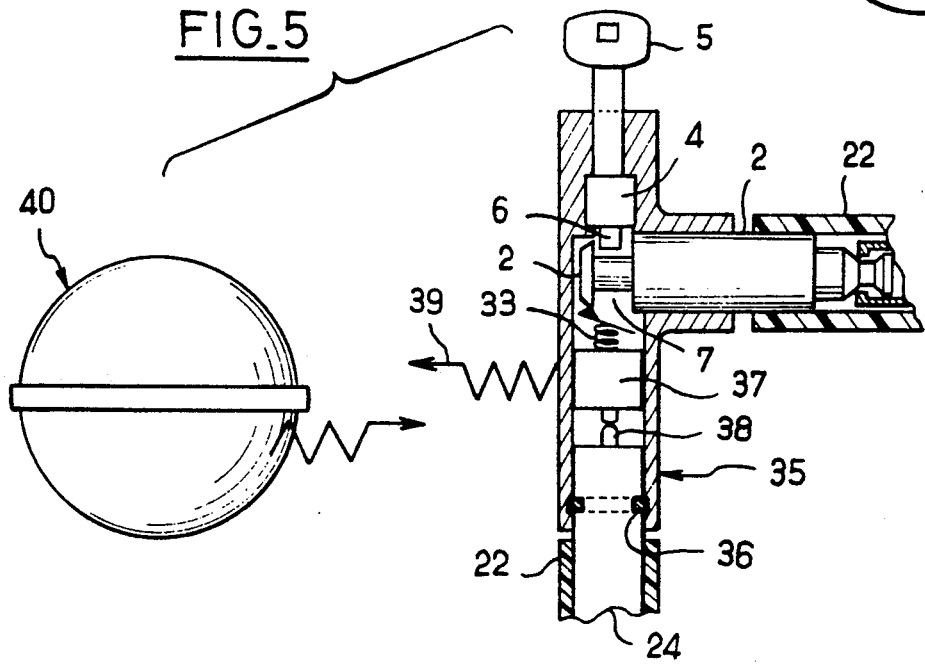
FIG_5

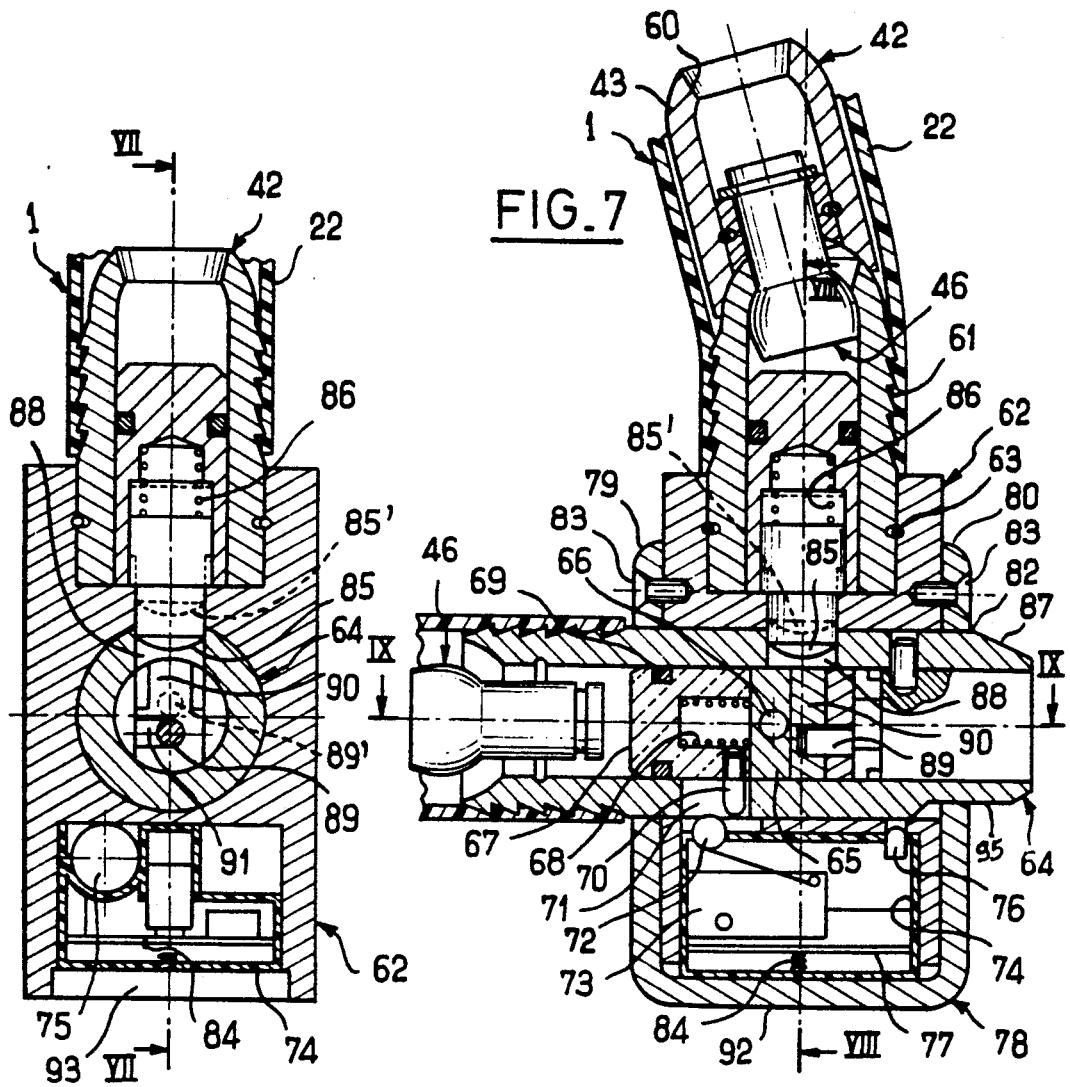
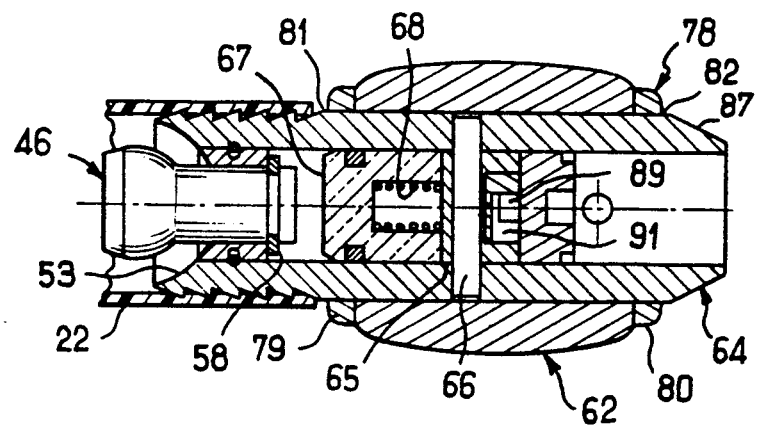

ANTI-THEFT DEVICE

The present invention relates to an anti-theft device and in particular to an anti-theft device of the type comprising a relatively flexible and deformable elongated assembly which is capable of forming a loop and is provided at one end with a male closure member and at the other end with a female closure member adapted to receive and lock the male closure member, one of said closure members being provided with a closure device which can be opened by means of a key in order to release the other closure member.

An anti-theft device of this type is intended in particular to protect two-wheeled vehicles or other moving equipment which it is desired to immobilize.

Two-wheeled vehicles, bicycles, auxiliary-engined bicycles, motorcycles, scooters and so on are often protected against theft by means of fastening cables or chains having a structure of more or less substantial strength. This does not prevent a person who has at his disposal a pair of pliers, shears, a hand-saw, a portable disk-saw, a crowbar, from releasing the vehicle in a very short time without attracting attention.

Since a cable can readily be sheared or cut, it is known to provide an anti-theft device of the type comprising a cable on which are threaded interengaged sleeves made of surface-treated steel. These sleeves have a surface hardness such that they cannot be attacked by the conventional cutting tools mentioned above. It is known, however, that these devices can be opened by means of a crowbar. Thus it is only necessary to place the crowbar substantially in the axis of the loop formed by the cable and to rotate the crowbar about an axis perpendicular to said bar so as to twist the cable first in a figure of eight, then in the form of a twisted pair. By tightening the twisted pair with sufficient force, it is thus possible to develop within the cable tensile stresses such that the strands of the cable break away from the locking members which are secured to the cable ends whilst the cable itself remains intact.

The object of the present invention is to overcome the disadvantages of known anti-theft devices and to propose an anti-theft device of the above-mentioned type which affords resistance to breaking-open by cutting, shearing, sawing, chain or disk sawing, which is simple and convenient to use, which is relatively inexpensive, and which cannot be opened by twisting by means of a crowbar.

In accordance with the invention, the anti-theft device is characterized in that the elongated assembly is made up of elongated elements undetachably assembled together in interengaged relation in the same manner as a chain, said elements being capable of presenting a certain angular divergence with respect to elements being provided with interengagement and coupling means which are alone intended to afford resistance to any forces which would separate these elements from each other.

The device in accordance with the invention is thus not provided with any cable whose attachment to the locking members located at its respective ends would constitute a weak point of the device in the event of an attempt to force-open the device by twisting.

Moreover, the limited angular divergence which is possible between two adjacent elongated elements limits the deformability of the anti-theft device and prohibits any attempt to twist this latter.

Thus, by going against an old preconceived opinion that a cable was necessary in an anti-theft device of the type mentioned above owing to its flexibility and exceptional characteristics of tensile strength, the present invention offers a simple solution to the problem stated in the foregoing.

In accordance with a first embodiment of the invention, each elongated element is made up of two separate and distinct parts articulated with respect to each other, on the one hand a substantially tubular shell provided at one end with a tapered portion having an axial opening smaller in diameter than the internal diameter of the tubular portion, on the other hand a pin having a cylindrical body which is intended to pass through said axial opening, and a head which is intended to penetrate into the tubular portion and to be retained by the tapered portion of the shell. The element is also composed of a tubular sleeve which is intended to be engaged over the cylindrical body of the pin and to be inserted within the tubular portion of the shell of an adjacent elongated element, as well as coupling means for rigidly fixing on the one hand the sleeve and the pin and on the other hand the sleeve and the shell of the adjacent elongated element.

Two adjacent elongated elements are thus fastened together substantially without play and the two corresponding shells are thus articulated with respect to each other.

The virtual absence of play prevents the insertion of any tool or foreign body for the purpose of separating the two elongated elements from each other.

Elongated elements of this type which can be interengaged by snap action make it possible to form simply, in an undetachable and therefore tamper-proof manner, an elongated assembly which is capable of forming a loop in order to provide an anti-theft device.

In accordance with an advantageous embodiment of the invention, the elongated assembly is housed within a flexible tube mounted in fluid-tight manner on the ends of said elongated assembly and containing a fluid under pressure, the closure member being provided with means for receiving and controlling the pressure of the fluid within the tube and detecting whether this pressure has reached a predetermined minimum value, and self-contained means for triggering an alarm when the pressure has reached this predetermined minimum value.

While resisting any attempt to break-open the device, the anti-theft device in accordance with the invention triggers an alarm in order to hinder any person who makes such an attempt. The means for triggering this alarm are self-contained and cannot be inactivated simply by cutting a wire providing a connection with an electric power source attached to the vehicle or to the equipment to be protected.

In accordance with an advantageous embodiment of the invention, the anti-theft device comprises an alarm unit separate from the closure member which is provided with means for transmitting a signal to the alarm unit when the pressure of the fluid has reached said predetermined minimum value, said signal being a radio signal, for example.

The alarm unit may thus be concealed on the vehicle or equipment to be protected at a location which cannot easily be reached, with the result that it is practically impossible to put this alarm unit out of service.

In accordance with a preferred embodiment of the invention, the anti-theft device comprises an element forming a cover providing access to the self-contained radio means. This element is electrically insulated from at least part of the remainder of the closure member and is electrically connected to an internal antenna of said radio means in order to serve as an external antenna.

Other distinctive features and advantages of the invention will become apparent from the detailed description given hereinafter.

In the accompanying drawings, which are given solely by way of non-limitative example:

FIG. 1 is a schematic fragmentary view, partly in cross-section, showing one embodiment of the invention;

FIG. 2 is an enlarged view of a detail of FIG. 1;

FIG. 3 is a view which is similar to FIG. 2 and illustrates adjacent elongated elements which are inclined at an angle with respect to each other;

FIG. 4 is an enlarged view of another detail of FIG. 1;

FIG. 5 is a view which is similar to FIG. 1 and shows another embodiment of the invention;

FIG. 7 is a sectional view taken along line VII—VII of FIG. 8 and showing the closure member in accordance with another embodiment of the invention;

FIG. 8 is a sectional view taken along line VIII—VIII of FIG. 7;

FIG. 9 is a sectional view taken along line IX—IX of FIG. 7;

Figures 6, 10:
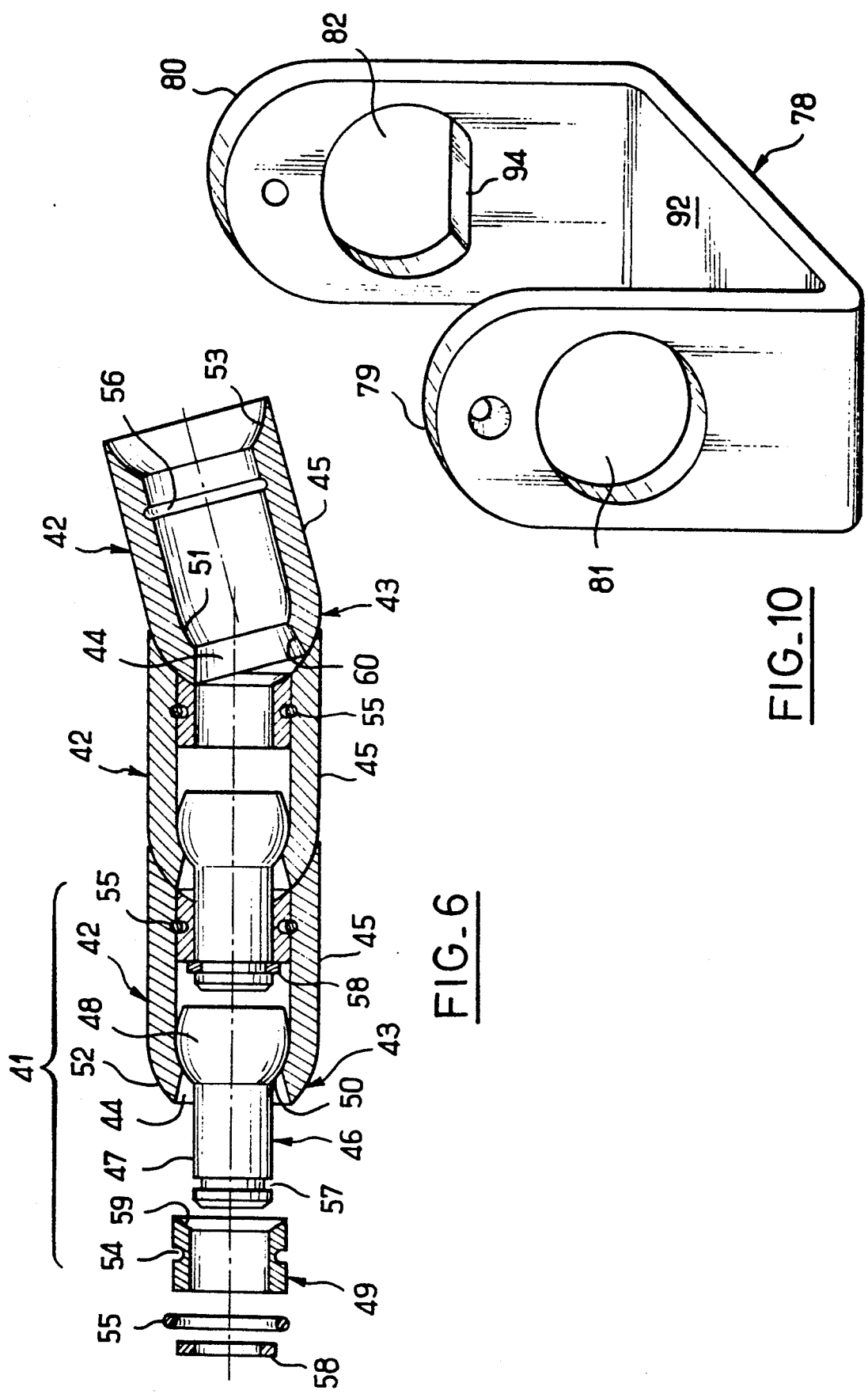
FIG. 6 is a view which is similar to FIGS. 2 and 3 and illustrates elongated elements in accordance with another embodiment of the invention.
FIG. 10 is a view in perspective showing the cover of the closure member illustrated in FIGS. 7, 8 and 9.

In the embodiment of FIG. 1, the anti-theft device is made up of a relatively flexible and deformable elongated assembly 1 substantially in the form of a chain which is capable of forming a loop. The chain 1 is provided at one end with a male closure member 2 and at the other end with a female closure member 3 adapted to receive and lock the male closure member 2. The female member is a spherical casing 3 composed of two hemispherical portions assembled together in any suitable manner. The casing contains a lock 4 which can be opened by means of a key 5. In the example shown, the bolt 6 of the lock engages in a groove 7 of the male member 2 in order to lock this latter and to lock the anti-theft device in the closed position.

The chain 1 is made up of elongated elements 8 forming links which are substantially cylindrical, formed in one piece, snap-actingly interengaged in an undetachable manner, and articulated with respect to each other.

The links 8 are formed, for example, of heat-treated steel having a surface hardness after treatment such that they cannot be damaged by pliers, by shears or by a saw. By way of example, they are of annealed and case-hardened 16 NC 6 steel.

As illustrated in detail in FIGS. 2 and 3, each link 8 is provided at one end with a female portion 9 and at its opposite end with a male head 10 which is intended to engage by snap action within the female portion 9 of an adjacent link 8.

The end of the female portion 9 is closed by a wall 11 having a circular axial opening 12 which is intended to receive the male head 10 of an adjacent link 8.

Behind the wall 11 extends a cylindrical cavity 13, the internal diameter of which is larger than that of the opening 12.

The male head 10 is provided with a groove 14 in its peripheral wall, the external diameter of which is slightly smaller than the internal diameter of the opening 12. Said groove 14 receives a retainer ring 15 which fits completely within the groove 14 in order to enable the head 10 to pass through the opening 12, then expands within the cavity 13 and prevents any withdrawal of the head 10.

A channel 16 formed at the periphery of the link 8 between the cylindrical body 17 and the head 10 of this latter receives the inner edge of the wall 11 and permits an angular divergence between two adjacent links 8.

When the chain 1 is in its closed and locked position as shown in FIG. 1, the internal radial edge 18 of the wall 11 and the radial edge 19 on the male end side of the peripheral channel 16 of the male head 10 which are given the shapes of cones having suitable angles are applied against each other (as shown in FIGS. 2 and 3).

The peripheral wall 20 between the channel 16 and the cylindrical body 17 of the link 8 is preferably of spherical shape and the same applies to the surface of the external radial edge 21 of the wall 11.

In the event of an attempt to break-open the anti-theft device, stresses are thus sustained on the one hand by the edges 18 and 19 and on the other hand by the surfaces 20 and 21 which are respectively in contact with each other, and not by the retainer ring 15.

The retainer ring 15 has been shown with a circular cross-section but can have any other cross-section and in particular a rectangular or trapezoidal cross-section.

As illustrated in FIGS. 1, 2 and 3, the chain 1 is inserted within a flexible tube 22 which is mounted in fluid-tight manner on the end links 23 and 24 and filled with a fluid under pressure such as, for example, a liquid and possibly a gas such as air in order to produce the pressure. The pressure can also be produced by the elasticity of the tube 22.

Thus, when an attempt is made to break-open the device and in the event of cutting of the tube 22 which is of plastic, for example, the liquid spills out and/or the gas escapes and the pressure within the tube 22 drops abruptly.

The liquid can be an indelible dye for marking the aggressor and/or a lubricant for facilitating the movements of the links with respect to each other. The gas can also be a tear gas.

The anti-theft device comprises, as shown in FIG. 1, the means required for receiving and controlling the pressure of the fluid within the tube 22 and for detecting whether this pressure has attained a predetermined minimum value, and means for triggering an alarm when the pressure has attained this predetermined minimum value.

The device thus comprises a manostat 25 which is incorporated in the end link 24 and controls a rod 26 for actuating a switch 27 which closes if the pressure within the tube 22 falls below a predetermined threshold value. The casing 3 also contains a battery or dry cell 28 and a sound warning device 29 such as a horn which is supplied by the dry cell 28 when the switch 27 is closed. The electric circuit can also include a switch 30 closed by the male end 2 of the chain 1 when the anti-theft device is closed and locked.

As illustrated in FIG. 4, the end link 24 is permanently fixed on the casing 1, for example by means of a nut 31 which is subsequently tightened hard up. The interior of the link 24 is hollow and constitutes a cylinder within which is housed a piston 32 which is urged on the side nearest the casing 3 by a spring 33 and on the side nearest the chain 1 by the pressure of the fluid contained within the flexible tube 22 which is fixed on the link 24 in fluid-tight manner.

If the pressure within the tube 22 falls to a value below the force of the spring 33, this latter thrusts the piston 32 towards the exterior of the casing 3 and said piston displaces the rod 26 so as to close the switch 27 and to actuate the sound warning device 29.

As also shown in FIG. 4, the end link 23 on the side corresponding to the free male end-piece 2 of the chain 1 penetrates into a tube 34 of the casing 3 and is locked in position by the bolt 6 of the lock 4 which is inserted in the groove 7.

In the embodiment of FIG. 5, the elements which are similar to those of FIG. 4 and carry out the same function are designated by the same reference numerals. The closure member 35 in which the end link 24 is snap-actingly engaged at 36 is fitted with a movable piston 37 which receives the pressure of the fluid on one side and the force of the spring 33 on the other side. When the piston 37 comes into contact with the electrode 38 of the link 24, an electric circuit is closed. The piston 37 and the closure member 35 are provided with means known per se for transmitting an alarm radio signal which is shown diagrammatically at 39 and indicates an attempt to break-open the device.

This radio signal 39 is received by a receiver unit 40 which is separate from the closure member 35 and comprises circuits which are known per se, said circuits being intended to receive the radio signal 39 and to actuate a horn (not shown). The unit 40 can thus be concealed on the vehicle or the equipment which it is desired to protect and can be made difficult to reach in order to avoid the risk of being put out of action.

In the embodiment of FIG. 6, each link 41 is made up of two separate and distinct parts which are articulated with respect to each other : on the one hand a substantially tubular shell 42 is provided at one end with a tapered portion 43 having an axial opening 44, the internal diameter of which is smaller than the internal diameter of the tubular portion 45; on the other hand a pin 46 has a cylindrical body 47 which is intended to pass through the axial opening 44, and a head 48 which is intended to penetrate into the tubular portion 45 and to be retained by the tapered portion 43 of the shell 42.

Each link 41 comprises in addition a tubular sleeve 49 which is intended to be engaged over the cylindrical body 47 of the pin 46 and to be inserted within the tubular portion 45 of the shell 42 of an adjacent link 41, as well as snap-action engagement means for coupling on the one hand the sleeve 49 and the pin 46 and on the other hand the sleeve 49 and the shell 42 of an adjacent link 41.

The head 48 of the pin 46 has a spherical external surface 50 and the internal wall 51 of the tapered portion 43 of the shell 42 has a spherical internal surface corresponding to said external surface 50.

The tapered portion 43 of the shell 42 has a spherical external surface 52 which is concentric with its internal surface 51 and the wall of the shell 42 has at the non-tapered end of this latter a spherical internal surface 53 corresponding to the spherical external surface 52 of the shell 42.

As can be seen in FIG. 6, when two adjacent links 41 are interengaged by snap action, the spherical external surface 50 of the head 48 of the pin 46 of the first link is substantially in contact with the spherical internal surface 51 of the tapered portion 43 of the shell 42 of this latter and the spherical external surface 52 of the shell 42 of the first link is substantially in contact with the spherical internal surface 53 of the wall of the shell 42 of the second link.

This arrangement is determined by the snap-action engagement means shown in the drawings. Thus the sleeve 49 is provided in its peripheral portion with a groove 54 in which a retainer ring 55 can disappear when the sleeve 49 is inserted within the shell 42 of an adjacent link 41. The ring 55 expands when the groove 54 arrives at the level of a corresponding groove 56 formed in the internal peripheral wall of said shell. The sleeve 49 is then snap-actingly engaged in a fixed position within the shell 42.

Moreover, the cylindrical body 47 of the pin 46 is provided near the end remote from the head 48 with a groove 57 in which a retainer ring 58 can completely disappear in order to enable the body 47 to pass into the sleeve 49.

When two links are engaged one inside the other as shown in FIG. 6, the groove 57 arrives at the level of the end of the sleeve 49, with the result that the retainer ring 58 expands and locks the pin 46 with respect to the sleeve 49. This assembly is undetachable and tamper-proof. That portion of the cylindrical body 47 which is apparent between the head 48 and that end of the sleeve 49 which is nearest the head 48 constitutes a channel which receives the edge of the opening 44 when two adjacent links are inclined at an angle with respect to each other.

The adjacent links 41 are therefore disposed in inter-engaged relation with practically zero clearance. By virtue of the spherical bearing faces mentioned earlier, the shell 42 of a link 41 is articulated in a ball-joint assembly both with respect to the head of the pin 46 which is associated therewith and with respect to the shell 42 of the adjacent link. In order to permit operation of these ball joints, the wall of the sleeve 49 at the sleeve end located nearest the head 48 of the associated pin 46 is widened at 59 in order to extend the internal spherical surface 53. Similarly, the peripheral wall 60 of the axial opening 44 of the tapered portion 43 has the shape of an outwardly flared cone frustum so as to permit an angular divergence between the shell 42 of a link 41 and the pin 46 of this latter which is retained within the shell of an adjacent link.

In the embodiment illustrated in FIGS. 7 to 9, the chain (not shown) formed by the links 41 is inserted in a flexible tube 22. The flexible tube 22 is secured in fluid-tight manner to the periphery of the end link 61 which is stationarily engaged by snap action within a female closure member 62 by means of a retainer ring 63. The tube 22 is also secured in fluid-tight manner to the periphery of the end-piece 64 which constitutes the free end of the chain. As in the embodiment of FIGS. 1 to 5, the tube 22 is filled with a fluid under pressure and the anti-theft device is provided with means for receiving and controlling the pressure of the fluid within the tube and for detecting whether this pressure has reached a predetermined minimum value, and with means for triggering an alarm when the pressure has reached this predetermined minimum value.

For this purpose, the end-piece 64 has a tubular structure and is provided substantially at the mid-point thereof with a transverse wall 65 which is attached to the peripheral wall of the end-piece 64 by means of a locking-pin 66.

A piston 67 is thrust by the pressure of the fluid against the wall 65 in opposition to the action of a spring 68 and is fitted with a peripheral O-ring seal 69 in order to contain the fluid. The piston 67 is also provided with a lug 70 which moves within a longitudinal housing 71 of the wall of the end-piece 64 if the piston 67 moves within the end-piece 64 under the action of the spring 68 when the pressure of the fluid drops within the tube 22, either during an attempt to force open the anti-theft device or as a result of a leakage of fluid. Thus, when the pressure has reached a predetermined minimum threshold value, the lug actuates the feeler 72 which projects to a slight extent within the housing 71 and forms part of a microswitch 73.

The microswitch 73 is enclosed within a separate casing 74 of insulating material which is removable and interchangeable. This casing contains all the elements which permit transmission of an alarm radio signal at the time of actuation of the feeler 72. Thus the casing contains in particular and in a manner known per se a dry cell 75, a wired printed circuit with its components (not shown), an electroluminescent control diode 76, an internal antenna 77.

In order to be protected mechanically, the casing 74 is provided with a removable cover 78 which is tightly fitted on the closure member 62. The cover 78 which is shown in particular in FIG. 10 has the shape of a U. Its arms 79 and 80 each have an opening 81, 82 respectively through which the end-piece 64 passes when the anti-theft device is in the closed and locked position shown in FIGS. 7 to 9. The cover 78 is thus retained on the closure member 62 and is also attached to this latter by means of two screws 83. Its base 92 fits within the cavity 93 formed between the lateral walls of the member 62 in order to protect the casing 74 (see FIG. 8).

The cover 78 serves as an external radio antenna. To this end, the cover is insulated from the general ground of the closure member 62. This insulation is carried out simply by means of a coat of epoxy paint and the contact between the internal antenna 77 and said external antenna 78 is established by means of a resilient foil element 84 mounted under pressure against the cover 78 on a small surface which remains conductive.

Even in the event of a deliberate short-circuit between said cover 78 and the general ground, the radio transmission is not disturbed. It is for this reason that the screws 83 which hold the cover 78 in position when the anti-theft device is open do not cause any hindrance.

Moreover, the closure member 62 has a closure piston 85, the rounded end of which is thrust by a spring 86 towards the interior of the opening of the member 62 which receives the end-piece 64. The closure piston 85 is shown in FIGS. 7 and 8 in full lines in its closed position and in dashed lines in its open position 85'.

The free end of the end-piece 64 has a surface which is tapered in the shape of a cone 87 with a view to lifting the closure piston 85 when the anti-theft device is closed. The device can therefore be closed without a key. When the end-piece 64 is in position, the closure piston 85 falls into a radial opening 88 of the end-piece 64 and locks this latter (position in full lines). The conical portion 87 of the end-piece 64 extends beyond the external wall of the arm 80 of the cover 78 in order to lock this latter when the anti-theft device is closed.

It is observed in FIG. 10 that the opening 82 of the arm 80 of the cover 78 has a flat face 94 on the side nearest the base 92 of the cover. This flat face 94 corresponds to an associated flat face 95 of the end portion of the end-piece 64 and serves to center said end-piece. When the end-piece has thus been centered, the radial bore 88 is automatically located in front of the closure piston 85 and the housing 71 is automatically positioned in front of the feeler 72.

The end-piece 64 is also provided at the end thereof with a lock barrel (not shown) which can be operated with a key. In a manner known per se, when the key is rotated through one half revolution, the barrel actuates a stud 89 which rotates about the axis of the end-piece 64 through an angle of 180°. During this movement, a push-rod 90 is lifted radially by the stud 89 in the direction of the piston 85, said push-rod being provided with a groove 91 in which the stud 89 is capable of sliding. When the stud 89 has rotated through an angle of 180° and is in the position 89' shown in dashed outline in FIG. 8, the push-rod 90 thrusts back the closure piston 85 to its position 85' shown in dashed lines, thus making it possible to withdraw the end-piece 64 from the member 62.

The links 41, the closure member 62, the cover 78, are preferably constructed of heat-treated steel such as annealed and case-hardened 16 NC 6 steel.

The shells of the links 41 have for example a thickness of approximately 4 mm, an external diameter of approximately 24 mm, a length of approximately 35 mm, which corresponds after engagement to a pitch of approximately 30 mm between two adjacent shells. The maximum angular divergence between two adjacent shells is 12° to 15°, for example.

There is thus obtained with thirty-five links 41 an anti-theft device which has a length of approximately 120 cm, which has a diameter of approximately 40 cm in the closed position, which offers resistance to the usual aggressions by shearing, sawing or twisting, and which triggers an alarm as soon as the tube 22 has been pierced. It is of course extremely easy to add according to requirements any number of links at the time of assembly of the anti-theft device.

To this end, the closure member 62 is associated with an alarm unit such as the unit 40 in FIG. 5, of any known type and concealed in the vehicle or the equipment to be protected at a location which is not readily accessible. This alarm unit is adapted to receive the radio signal transmitted by the cover 78 and to supply all audible and visual alarm devices such as horn, flashing light indicators and so on. A unit of this type is known per se and does not need to be described in detail here.

The mode of operation and utilization of the device shown in FIGS. 6 to 10 will now be summarized hereunder. The greater part of this description is applicable to the embodiment illustrated in FIGS. 1 to 5.

The diode 76 is turned-on when the user engages the end-piece 64 within the opening of the closure member 62. At this instant, the microswitch 73 is actuated by its feeler 72 which is thrust back by the end-piece 64 and energizes the radio transmitter. The diode 76 is turned-on, thus making it possible to check the electronic system, the contact of the microswitch 73, the state of the dry cell 75, the state of the diode 76, the correct operation of the radio transmission to the receiver 40. Thereupon, when the end-piece 64 is located in its closed position, the closure piston 85 which has been lifted by the inlet cone 87 of the end-piece 64 falls within the bore 88 and locks the assembly. No key is required for the purpose of locking the anti-theft device.

Similarly, in the closed position, the feeler 72 of the microswitch 73 falls into the housing 71 and, by means of the switch 73, opens the electronic circuit of the radio transmitter which no longer consumes any energy from this moment onwards.

The oil pressure within the tube 22 maintains the piston 67 mechanically applied in abutting contact with the wall 65 while compressing its restoring spring 68.

In the event of a pressure drop, the piston 67 is thrust back by the spring 68, the lug 70 which is associated with the piston 67 undergoes a displacement and actuates the feeler 72 which initiates a radio transmission.

Said lug 70 has two functions:
1) it actuates the microswitch 73 in the event of oil leakage;
2) it also serves as a visual indicator for the position of the piston 67 and therefore to check the oil pressure within the tube 22. It permits detection of microleaks which may occur in the course of time.

Radio transmission preferably takes place at a frequency of 303.875 MHz which is approved in many countries but can also be at other approved frequencies such as approximately 224 MHz.

The transmission is of course coded in order to prevent untimely interferences, in particular intentional turning-on of the system by means of a transmitter having the same frequency. The radio receiver of the alarm unit 40 is also coded and tuned to the transmitter frequency.

As will be readily apparent, the invention is not limited to the embodiments described in the foregoing and many changes and modifications may be made in these embodiments without thereby departing from the field of the invention.

It is thus possible to modify the links or the elements constituting these latter and to replace them by equivalent elements. For example, the circular-section retainer rings can be replaced by rings having a rectangular section or the like and conversely. It is also possible to replace the rings by systems consisting of balls or studs which are subjected to the pressure of springs and perform the same functions, or by other snap-action engagement devices.

The snap-action engagement means described can be replaced by other equivalent means such as crimping carried by swaging the metal of the shell which penetrates into the sleeve and of the metal of the sleeve which penetrates for example into a peripheral groove of the pin.

The locking systems described can be replaced by other equivalent systems which carry out the same functions and produce the same results. It is also possible to modify the distribution of the constituent elements between on the one hand the free end-piece and on the other hand the closure member. The anti-theft device described can also be used without the alarm devices described, whether they are integral with the anti-theft device or separate from this latter. It is clearly possible to modify the structure, the shape and the mode of assembly of the various constituent elements of the anti-theft device in accordance with the invention.

Similarly, the anti-theft device described is intended to be equipped with a standardized lock of the "alarm" type which is both undrillable and tamper-proof. It may of course be equipped with a lock of any desired type and may in particular be adapted to a so-called electronic lock of any desired type. It would only be necessary to insert in a slot of the closure member a coded chip card read by a reader contained in said member. The push-rod could in that case be displaced by an electric micromotor. The dry cell which supplies this motor could for example be housed either within the closure member or within a handle attached to the chip card.

It is also possible to use the anti-theft device in accordance with the invention without a tube 22, without a manostat and without an alarm, the device being limited to the assembly of links equipped respectively at its ends with a female closure element and a male end-piece.

Finally, consideration can be given to links which do not have symmetry of revolution as described and illustrated.

I claim:

1. Anti-theft device comprising a flexible and deformable elongated assembly (1) which is capable of forming a loop and is provided at one end with a male closure member (2, 64) and at the other end with a female closure member (3, 2) adapted to receive and releasably lock the male closure member (2, 64). One of the closure members (3, 62; 2, 64) being provided with a closure device which can be opened by key means in order to release the other closure member, the elongated assembly (1) is made up of elongated elements (8, 41) undetachably assembled together in interengaged relation in the form of a chain, said elements being swingable with respect to each other so as to form a loop, each elongated element (8, 41) being provided at one end with a female portion (9, 42) and at the opposite end with a male portion (10; 46, 49), the male portion (10; 46, 49) having successively, starting from said opposite end thereof, peripheral retaining means (14, 15; 54, 55) undetachably connecting said elongated element (8, 41) to an adjacent elongated element (8, 41), and peripheral grooves (16; 49, 47, 50) separate from the peripheral retaining means (14, 15; 54, 55) and limited on the side opposite said peripheral retaining means by a shoulder (20, 50), said male portion (10; 46, 49) passing through an opening (12, 44) at said one end, said shoulder (20, 50) of said male portion (10; 46, 49) abutting against an edge (21, 51) of said opening (12, 44), edges of said opening (12, 44) and of said peripheral groove means (16; 49, 47, 50) being so shaped that said male portion (10; 46, 49) is swingable with respect to said female portion (9, 42), radially opposed parts of walls (18, 21; 60, 51) of said opening (12, 44) contacting parts of walls (19, 20; 47, 50) of said peripheral groove means (16; 49, 47, 50) and bearing directly on the last-named walls (19, 20; 47, 50) to prevent separation of the elongated elements (8, 41) from each other.

2. Anti-theft device according to claim 1, characterized in that the elongate elements (8, 41) have symmetry of revolution with respect to their longitudinal axis.

3. Anti-theft device according to claim 1 characterized in that each elongated element (8) is a single-piece element, that the end of the female portion (9) is closed by a wall (11) having a substantially circular axial opening (12) which is intended to receive the male portion (10) of an adjacent elongated element (8) and that behind said wall (11) extends a substantially circular cavity (13) having a larger diameter than the opening (12), resilient or resiliently mounted means (15) for snap-action engagement of the male portion (10) being capable of expanding within said cavity and of withdrawing completely within the peripheral groove (14) of the external peripheral wall of said male portion in order to pass through the opening (12) and to prevent withdrawal of said male portion (10) once said means have expanded.

4. Anti-theft device according to claim 1 characterized in that each elongated element (41) is made up of two separate and distinct parts articulated with respect to each other, on the one hand a substantially tubular shell (42) provided at one end with a tapered portion (43) in which is formed an axial opening (44) having a smaller internal diameter than the tubular portion (45), on the other hand an element forming a pin (46) having a cylindrical body (47) which is intended to pass through said axial opening (44), and a head (48) which is intended to penetrate into the tubular portion (45) and to be retained by the tapered portion (43) of the shell (42).

5. Anti-theft device according to claim 4, characterized in that the elongated element (41) is also composed of a sleeve (49) which is intended to be engaged over the cylindrical body (47) of the pin (46) and to be inserted within the tubular portion (45) of the shell (42) of an adjacent elongated element (41), as well as coupling means (57, 58; 54, 55, 56) on the one hand between the sleeve (49) and the pin (46) and on the other hand between the sleeve (49) and the shell (42) of the adjacent elongated element (41).

6. Anti-theft device according to claim 5, characterized in that the head (48) of the pin (46) has a spherical external surface (50) and constitutes a ball-joint coupling with the internal wall (51) of the tapered portion (43) of the shell (42).

7. Anti-theft device according to claim 7, characterized in that the tapered portion (43) of the shell (42) of an element (41) has a spherical external surface (52) and constitutes a ball-joint coupling with the oppositely-facing edge (53) of the wall of the shell (42) of the adjacent element (41).

8. Anti-theft device according to claim 7, characterized in that, when two adjacent elongated elements (41) are assembled one inside the other, the spherical external surface (50) of the head (48) of the pin (46) of the first element (41) is substantially in contact with the internal surface (51) of the tapered portion (43) of the shell (42) of this latter and the spherical external surface (52) of the shell (42) of the first element (41) is substantially in contact with the oppositely facing edge (53) of the wall of the shell (42) of the second element (41), the two spherical surfaces 9. Anti-theft device according to claim 1 characterized in that the elongated assembly (1) is housed within a flexible tube (22) mounted in fluid-tight manner on the ends of said elongated assembly (1) and containing a fluid under pressure, the anti-theft device being provided with means for receiving and controlling the pressure of the fluid within the tube (22) and for detecting whether this pressure has reached a predetermined minimum value, and means for triggering an alarm when the pressure has reached this predetermined minimum value.

10. Anti-theft device according to claim 9, characterized in that it comprises an alarm unit (40) separate from the closure member (3, 62) which is provided with means for transmitting a signal to the alarm unit (40) when the pressure of the fluid has reached said predetermined minimum value.

11. Anti-theft device according to claim 10, characterized in that the means for transmitting a signal are self-contained means (74) for transmitting an electromagnetic signal such as a radio signal, for example.

12. Anti-theft device according to claim 11, characterized in that it comprises an element forming a cover (78) providing access to the self-contained radio means (74), that said element (78) is electrically insulated from at least part of the remainder of the closure member (62) and is electrically connected to an internal antenna (77) of said self-contained means (74) in order to serve as an external antenna.

13. Anti-theft device according to claim 12, character in that the cover (78) is electrically insulated from the closure member (62) by means of a coat of insulating paint.

* * * * *